United States Patent
Ackermann et al.

(10) Patent No.: US 11,512,825 B2
(45) Date of Patent: Nov. 29, 2022

(54) LIGHTING DEVICE WITH BATTERY HOUSING

(71) Applicant: SIGNIFY HOLDING B.V., Eindhoven (NL)

(72) Inventors: Bernd Ackermann, Eindhoven (NL); Matthias Wendt, Eindhoven (NL); Goutam Maji, Eindhoven (NL); Priya Ranjan Mishra, Eindhoven (NL); Eduard Gerhard Zondag, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 53 days.

(21) Appl. No.: 16/971,198

(22) PCT Filed: Feb. 18, 2019

(86) PCT No.: PCT/EP2019/053924
§ 371 (c)(1),
(2) Date: Aug. 19, 2020

(87) PCT Pub. No.: WO2019/162214
PCT Pub. Date: Aug. 29, 2019

(65) Prior Publication Data
US 2021/0116089 A1    Apr. 22, 2021

(30) Foreign Application Priority Data

Feb. 22, 2018   (IN) .............................. 201841006734
Apr. 6, 2018    (EP) ...................................... 18166101

(51) Int. Cl.
*F21S 9/02*     (2006.01)
*H01M 10/42*    (2006.01)
(Continued)

(52) U.S. Cl.
CPC ........... *F21S 9/02* (2013.01); *H01M 10/4221* (2013.01); *H01M 10/46* (2013.01); *H01M 10/48* (2013.01)

(58) Field of Classification Search
CPC ......... F21S 9/02; F21L 4/00; H01M 10/4221; H01M 10/46; H01M 10/48; H01M 50/20;
(Continued)

(56) References Cited

U.S. PATENT DOCUMENTS

| | | | |
|---|---|---|---|
| 6,942,359 B2 * | 9/2005 | Furth | .................. H01M 50/213 362/205 |
| 7,102,172 B2 | 9/2006 | Lynch et al. | |

(Continued)

FOREIGN PATENT DOCUMENTS

| | | |
|---|---|---|
| EP | 3232493 A1 | 10/2017 |
| JP | 06008094 B2 | 2/1994 |
| WO | 2009020708 A1 | 2/2009 |

*Primary Examiner* — Peggy A Neils

(57) ABSTRACT

The present disclosure relates to a lighting device (100) comprising a lighting unit (102), at least one application unit (104), and a battery housing (106) comprising a first battery compartment (108) with a first electrical contact set (110) for accommodating and connecting a first battery and with a second battery compartment (112) with a second electrical contact set (114) for accommodating and connecting a second battery, wherein the first and second battery compartments are configured to force an exclusive spatial accommodation of only one of the first and second batteries in the battery housing at a given point in time. The lighting unit is electrically connected to the first electrical contact set for being powered by the first battery in a first operational mode and the application unit is electrically connected to the second electrical contact set for being powered by the second battery in a second operational mode.

10 Claims, 4 Drawing Sheets

(51) Int. Cl.
*H01M 10/46* (2006.01)
*H01M 10/48* (2006.01)

(58) Field of Classification Search
CPC ....... H01M 2010/4278; H01M 6/5066; H01M 2220/30; H02J 7/00036; H02J 7/00041; H02J 7/00043; H02J 7/00047; H02J 7/0045
See application file for complete search history.

(56) References Cited

U.S. PATENT DOCUMENTS

| | | | |
|---|---|---|---|
| 7,850,330 B2* | 12/2010 | Spartano | F21L 4/027 362/195 |
| 9,954,205 B2* | 4/2018 | Liu | H01M 50/213 |
| 2012/0235593 A1 | 9/2012 | Snyder et al. | |
| 2014/0266057 A1 | 9/2014 | Woods | |
| 2014/0277887 A1 | 9/2014 | Slattery et al. | |

* cited by examiner

LIGHTING DEVICE WITH BATTERY HOUSING

CROSS-REFERENCE TO PRIOR APPLICATIONS

This application is the U.S. National Phase application under 35 U.S.C. § 371 of International Application No. PCT/EP2019/053924, filed on Feb. 18, 2019, which claims the benefits of European Patent Application No. 18166101.8, filed on Apr. 6, 2018, and Indian Patent Application No. 201841006734, filed on Feb. 22, 2018. These applications are hereby incorporated by reference herein.

TECHNICAL FIELD

The present disclosure relates to a lighting device and to a lighting arrangement.

BACKGROUND

U.S. Pat. No. 7,102,172 B2 describes a light emitting diode (LED) luminaire with a modular mounting configuration including a light source module having a plurality of pre-packaged LEDs arranges in a serial array. A sensor is configured to detect environmental parameters and a driver is configured to illuminate the LEDs in response to the environmental parameters, thereby selectively configuring the LEDs to function in a wide variety of applications. One embodiment of an LED luminaire described therein comprises a backup power source such as a battery.

US 2012/235593 A1 discloses an electronic circuit and/or a method that determines a type and/or size of a battery in a light and controls operation of a light source may comprise: a circuit measuring the voltage of the battery; and a processor for determining the measured battery voltage. The processor may compare the measured battery voltage and a predetermined voltage and set an operating condition of the light source based upon the difference between the measured battery voltage and the predetermined voltage.

WO 2009/020708 A1 relates to a portable lighting device (10) including a body (12) having a battery compartment (30), a head (14) coupled to the body, a light source (24) coupled to the head, the light source requiring a first voltage, and a circuit (22) coupled to the light source. The battery compartment is configured to selectively receive batteries of different sizes. The circuit converts voltages of different magnitudes to the first voltage.

SUMMARY

It would be beneficial to provide a lighting device with improved application-specific battery power supply.

According to a first aspect of the present disclosure a lighting device is presented. The lighting device comprises
a lighting unit configured to perform a lighting function under a first operational mode of the lighting device;
at least one application unit different from the lighting unit and configured to perform an application function different from the lighting function under a second operational mode of the lighting device;
a battery housing comprising a first battery compartment with a first electrical contact set for accommodating and connecting a first battery, and a second battery compartment with a second electrical contact set for accommodating and connecting a second battery, wherein the first and second battery compartments are configured to force an exclusive spatial accommodation of only one of the first and second batteries in the battery housing at a given point in time; wherein
the lighting unit is electrically connected to the first electrical contact set for being powered by the first battery in the first operational mode; and
the application unit is electrically connected to the second electrical contact set for being powered by the second battery in the second operational mode.

The lighting device of the first aspect is thus configured to perform a lighting function wherein a lighting unit is operated under a first operational mode. The lighting device is also configured to perform an application function that is different from the lighting function. In the application function, an application unit that is not the lighting unit is operated under a second operational mode. The first operational mode involves the delivery of a first power amount to the lighting unit in accordance to specific power requirements of the lighting unit, which may vary with time. Conversely, the second operational mode of the lighting device involves the delivery of a second power amount to the application unit in accordance to specific power requirements of the application unit, which may also vary with time.

Generally, a maximum power requirement of the lighting unit under the first operational mode is different than a maximum power requirement of the application unit under the second operational mode. For achieving a tailored and optimized power delivery for each operational mode of the lighting devices, different batteries types are needed, each battery type having a different size, energy density, efficiency, safety aspects, environmental aspects such as those related to recycling, being rechargeable or non-rechargeable, etc.

The lighting device thus comprises a battery housing that has a first battery compartment and a second battery compartment. The first and second battery compartments include a respective electrical contact set for connecting a respective first and a second battery. The first and second battery compartments are configured to force an exclusive spatial accommodation of only one of the first and second battery in the battery housing at a given point in time. Therefore, while the first battery is installed inside the first battery compartment, the second battery cannot be installed in the second battery compartment. Conversely, while the second battery is installed, the first battery cannot be installed at the same time. Therefore, although the battery housing generally allows an accommodation and electrical connection of a first or a second battery, only one of them can be installed at a given point in time because the first and second battery compartment force the accommodation of only of the first and second batteries.

Further, the lighting unit is electrically connected to the first electrical contact set for being powered by the first battery in the first operational mode of the lighting device, whereas the application unit is electrically connected to the second electrical contact set for being powered by the second battery in the second operational mode. Thus, the first battery compartment is advantageously designed and configured to accommodate a first battery from a predetermined first battery type that, when fully functional, is able to provide electrical power for operating the lighting unit under the first operational mode. In turn, the second battery compartment is designed and configured to accommodate a second battery, belonging to a second battery type that, when fully functional, is able to provide electrical power for operating the application unit under the second operational mode.

The lighting device of the first aspect thus allows the installation of a dedicated battery in accordance with the particular power requirements of the lighting unit or the application unit without having to accommodate both of them simultaneously. This allows for a reduction of a size of the lighting device. The choice of battery to be installed may depend on the intended use according to a stage of the lighting device's life cycle.

In the following, embodiments of the first aspect will be presented.

Generally, requirements for batteries in lighting devices differ strongly for different stages or phases of the lighting device's life cycle, which include, for instance, phases of transportation, storage, installation, utilization, repair, disposal, etc.

Generally, the application unit requires less maximal electrical power to operate under the second operational mode than the maximal electrical power required by the lighting unit to operate under the first operational mode. Therefore, the first battery compartment is configured to accommodate and electrically contact a first battery having a larger power capacity than a second battery configured to provide power to the application unit under the second operational mode that has lower power requirements. Typically, batteries having larger capacities have a larger volume than those having less capacity.

In some embodiments, the first operational mode includes operation of the lighting unit as a portable light. In other embodiments, the first operational mode includes operation of the lighting unit as an emergency light.

In some embodiments, the application unit comprises a sensing unit, a communication unit, a display unit or any unit other than a lighting unit that enables additional functionality, like for instance, presence or movement sensing, light sensing or other sensor triggers, wireless or wired communication with an external device, current status display, pre-commissioning prior to or during installation, stand-by function controller, etc.

Typically, large batteries with high energy storage capability are used for powering the lighting unit. The lighting unit is in some embodiments a LED lighting system comprising a plurality of light emitting diodes. However, these batteries are sometimes subject to restrictions, in particular during transport. In most cases, however, the lighting function is not required at this stage. The lighting devices according to the present disclosure therefore enable an accommodation of a second battery, which for instance is not subject to the restrictions stated above. The second battery, having typically less power capacity than the larger first battery, can still provide electrical power for operating the lighting device in a second operational mode, i.e. to drive the application unit for performing the application function. This typically requires less electrical power than operating the lighting unit.

In some embodiments, the lighting device further comprises a battery identification unit that is electrically connected to the first and the second electrical contact sets and that is configured to ascertain whether or not the first or the second battery is installed and to provide a battery information signal indicative thereof. In some of these embodiments, the detection that a battery is installed in the first or the second battery compartment already provides information about a battery type installed, namely a first battery pertaining to a first expected battery type or a second battery pertaining to a second expected battery type. In other embodiments, the battery identification unit is configured to ascertain further battery parameters like its maximal and current capacity, if the inserted battery is a rechargeable battery or a non-rechargeable battery, etc. Some of these embodiments comprise a battery identification unit and are compatible with smart batteries that are advantageously configured to internally measure voltage and current and ascertain a current charge level and state of health (SoH) parameters indicative of a state of the smart battery. Also, in these embodiments, at least one of the first and the second electrical contact sets is compatible with the smart battery, i.e. is configured to be connected to a data port of the smart battery in accordance with specifications of a predetermined battery management system (BMS).

Some of these lighting devices further include a lighting device control unit, which receives the battery information signal and is configured to control operation of the lighting unit and of the application unit in dependence on the battery information signal. In these embodiments, the lighting device control unit is thus configured to control a transfer of power from the first or the second battery to the lighting unit or the application unit respectively, in dependence on the battery information signal and is therefore advantageously configured to tailor the operation of the lighting unit or the application unit in view of the battery information signal. For instance, in cases where the battery information signal comprises information pertaining to a current capacity of the installed battery, the lighting device control unit can advantageously be configured to adjust the operational mode of the lighting or application unit in dependence of the current capacity, for example, for maximizing battery life or for maximizing operation time.

Some embodiments of the lighting device of the first aspect further comprise a power input interface that is configured to receive electrical power from an external power supply device that is different from the first and the second battery. They also comprise a first controllable supply switch connected to the first and second electrical contact set to the lighting unit, to the application unit and to the power input interface. Further, they include a power control unit configured to ascertain whether or not a sufficient amount of electrical power is being received via the power input interface, and, when a sufficient amount of electrical power is being delivered, to operate the first supply switch for allowing a transfer of power from the power input interface to the lighting unit or the application unit or to both the lighting unit and the application unit. Therefore, some of these embodiments are configured to enable a simultaneous operation of the lighting unit and the application unit with power received from the external power supply device via the power input interface.

These embodiments are advantageously configured to be connected to an external power supply device other than the first or the second battery, i.e., a source of power for which there is no battery compartment in the battery housing. For instance, some of these lighting devices are configured to be connected to and receive electrical power from an external generator whereas others are configured to be connected to and to receive electrical power from a mains electrical supply. Other lighting devices are connected to a power supply device via an Ethernet connection according to specifications of Power over Ethernet (PoE). When enough power is being received from the external power supply via the power input interface for operating the lighting unit or the application unit, the power control unit controls the first controllable supply switch so that the power required from operation of the lighting or the application unit is supplied by the external power supply via the power input interface and not by the first or the second battery. In some lighting devices, in case of a power delivery failure or interruption of power from the external power supply device, the power control unit ascertains that the received amount of electrical power is not sufficient and operates the first switch supply for allowing a transfer of power from the first or the second battery. Depending on the specification of the installed battery, operation during a power delivery failure from the external power supply device can be achieved based on the power obtained from the installed battery.

Some of the embodiments that comprise a power input interface, a power control unit and a battery identification unit are advantageously configured to allow a transfer of power from an external power supply to the first or second battery in cases where the battery identification unit detects that the installed battery is a rechargeable battery. In these embodiments, the lighting device further comprises a charging circuit connected between the power input interface and at least one of the first and second electrical contact sets. The charging circuit is configured to transform the electrical power received via the power input interface and to provide the transformed electrical power via at least one of the first and second electrical contact sets. In these embodiments, the battery identification unit is configured to detect whether or not the installed battery is rechargeable or non-rechargeable and to include the detection result in the battery information signal and the power control unit is further configured to receive the battery information signal and to operate the charging circuit in dependence on the battery information signal.

Some of these embodiments thus allow for a re-charging of a rechargeable battery installed only in the first battery compartment, other embodiments allow for a re-charging of a rechargeable battery installed only in the second battery compartment, whereas other embodiments allow for a recharging of a rechargeable battery installed in either the first or the second battery compartment.

The charging circuit in some embodiments comprises a first and a second charging sub-circuit connected to the first and the second electrical contact sets respectively and that transforms the electrical power received via the input power interface to the specific type of battery that is intended to be accommodated in the first or the second battery compartment and connected to the first or second electrical contact set respectively.

In some embodiments the first and the second charging sub-circuits share some circuitry, which is electrically adjacent to the power input interface. This shared circuitry is configured to perform a first step of transforming electrical power. The rest of the charging sub circuit, that is not shared, is electrically close to the first and the second electrical contact sets and comprises specific circuitry performing a second step of transforming electrical power to respective requirements of the battery connected to the first or second electrical contact set.

Some embodiments are configured to accommodate and electrically connect a smart battery to either one of the first or second battery compartment or to both. The smart battery can advantageously be configured to communicate with the power control unit in accordance with the smart battery system specifications. The smart battery is then configured to demand power for charging, to stop delivery of power, i.e. demand that a charging process stops, control a delivery of power from the battery to the corresponding electrical contact set, etc. Additionally, the smart battery may comprise appropriate firmware for a particular application unit.

In the embodiments wherein a smart battery can be used, the first or the second or both electrical contact sets further comprise a data input interface connected to the battery identification unit, the data input interface configured to be connected to a data output port of an external smart battery. In these embodiments, the lighting device control unit is further configured to receive a smart battery information signal pertaining to a current state of the smart battery and to operate the lighting unit and the application unit in dependence on the received smart battery information signal.

Some lighting devices are configured to operate under a third operational mode of the lighting device. In this third operational model the lighting device is configured to simultaneously operate the lighting unit for performing the lighting function and the application unit for performing the application function. In order to operate in this third operational mode, the application unit is further electrically connectable to the first electrical contact set via a second controllable supply switch and the lighting device control unit is additionally configured to control the second supply switch for connecting or disconnecting the application unit from the first electrical contact set. In these embodiments, the lighting device can operate in a third operational mode in which the first battery connected to the first electrical contact set is configured to provide electrical power to the lighting unit and to the application unit simultaneously.

There are other embodiments, in which, alternatively or additionally, the lighting device is configured to operate in the third operational mode using electrical power obtained from the second battery accommodated in the second battery compartment and electrical connected to the second electrical contact set. In these embodiments the lighting unit is further electrically connected to the second electrical contact set via a third controllable supply switch and the lighting device control unit is additionally configured to control the third supply switch for connecting and disconnecting the lighting unit from the second electrical contact set.

Other embodiments of the lighting device of the first aspect further comprise a communication unit that is connected to the battery identification unit and configured to receive the battery information signal and to output a battery information message, which comprises battery information that is included in the battery information signal, in accordance with a predetermined communication protocol to an external battery monitoring device via a data exchange port. Such a battery monitoring device can for instance be configured to receive and decode the battery information message and to process information comprised in the battery information message pertaining to the currently installed battery. This is for instance advantageous in lighting arrangements comprising a plurality of lighting devices since it allows a centralized monitoring of the connected lighting devices. The battery information pertaining to the batteries installed can then be externally analyzed by the battery monitoring device. This enables, for example, to monitor if the connected lighting devices are equipped with an appropriate battery and to inform a user if any of the batteries needs replacement. The communication of the battery information message is in some embodiments achieved via a wired communication protocol. In other embodiments a wireless communication protocol is used.

In order to increase a life-time of an installed battery, some embodiments of the lighting device of the first aspect comprise a temperature sensing unit connected to the power input interface. The temperature sensing unit is configured to monitor a temperature value of a predefined position of the lighting device and to provide a temperature signal indicative thereof, and a thermostatic unit connected to the power input interface. The thermostatic unit is configured to receive the temperature signal and to regulate the temperature value of the predefined position according to the temperature signal and to a predefined set-point temperature.

The lighting device of the first aspect is in some embodiments a lamp. In other embodiments the lighting device is a luminaire. Some of these embodiments are configured to receive electrical power from a mains electrical supply and feed the received electrical power to one or more lighting units via a galvanic connection. Other embodiments of the lighting device of the first aspect are portable lighting devices.

According to a second aspect, a lighting arrangement is presented. The lighting arrangement comprises at least one lighting device including a communication unit connected to the battery identification unit and configured to receive the battery information signal and to output a battery information message in accordance with a predetermined communication protocol to a battery monitoring device via a data exchange port and the battery monitoring device configured to receive, via a data exchange port of the battery monitoring device, the battery information message in accordance with the predetermined communication protocol, and to output a status signal indicative thereof.

In some embodiments of the lighting arrangement the communication of the battery information message is performed via a wired communication protocol. In other embodiments a wireless communication protocol is used. In other embodiments the lighting device and the battery monitoring device are connected via an Ethernet link. In some of these embodiments, the battery monitoring device forms a unit of a sourcing equipment in the sense of Power-over-Ethernet (PoE) which is configured to provide electrical power and data via the Ethernet link.

It shall be understood that the lighting device of system of claim 1, and the lighting arrangement of claim 10, have similar and/or identical preferred embodiments, in particular, as defined in the dependent claims.

It shall be understood that a preferred embodiment of the present disclosure can also be any combination of the dependent claims or above embodiments with the respective independent claim.

These and other aspects, objects, features, and embodiments will be apparent from and elucidated with reference to the embodiments described hereinafter.

DETAILED DESCRIPTION OF EMBODIMENTS

Figure 1:
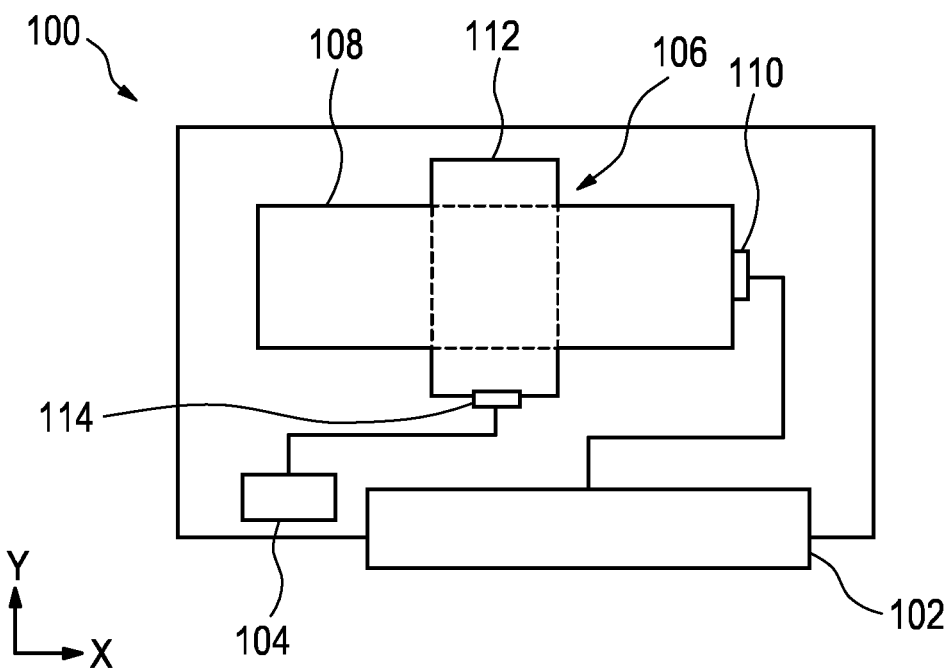
FIG. 1 shows a schematic block diagram of an exemplary embodiment of a lighting device.

FIG. 1 shows a schematic block diagram of an exemplary lighting device 100. The lighting device 100 includes a lighting unit 102 and an application unit 104. The lighting unit 102 is configured to perform a lighting function under a first operational mode of the lighting device. In this particular lighting device 100, the application unit 104 is configured to perform an application function that includes pre-commissioning prior to or during installation of the lighting device. This application function is different from the lighting function of the lighting unit and is performed under a second operational mode of the lighting devices. In other lighting devices, the corresponding application unit is configured to perform other application functions such as communication functions, sensing functions, any combination thereof, etc.

The lighting device has a battery housing 106 that comprises a first battery compartment 108 and a second battery compartment 112 for accommodating a respective first and second battery. The first battery compartment 108 has a first electrical contact set 110 to electrically connect the first battery and the second battery compartment 112 has a second electrical contact set 114 to electrically connect the second battery. In dependence of power requirements of the lighting unit and the application unit, the first and second battery compartments are designed to accommodate and connect a first and a second battery respectively that belong to a first and a second battery type, typically having different nominal dimensions, and nominal power capacities (e.g., in terms of energy or power density, efficiency, number of cycles, etc.).

Figures 2A, 2B:
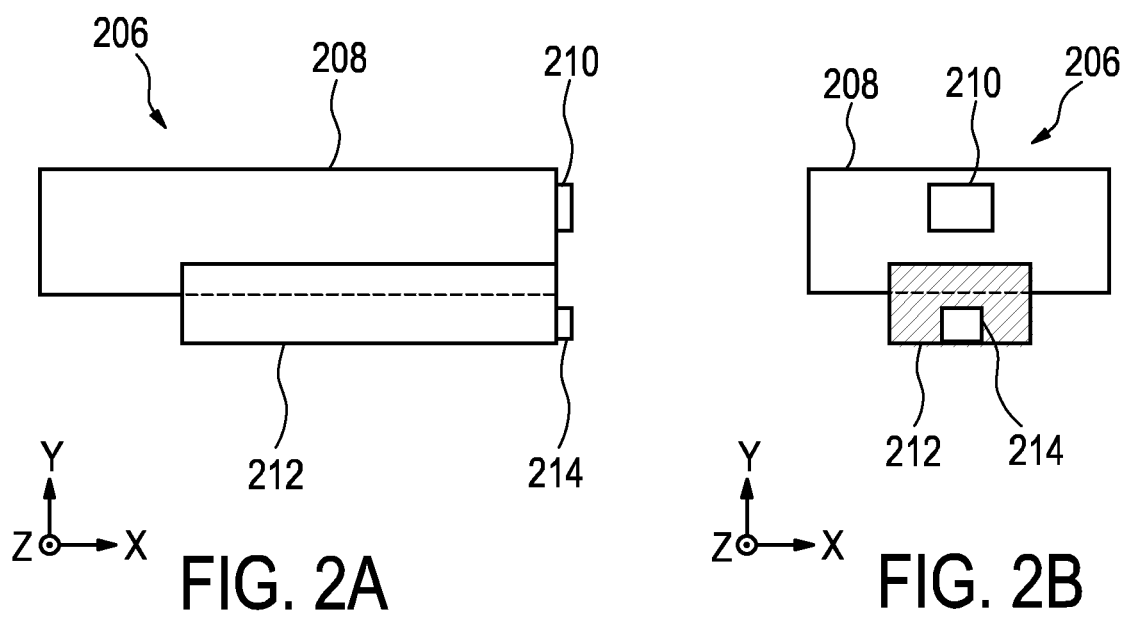
FIG. 2A shows a sectional view of an exemplary battery housing.
FIG. 2B shows another sectional view of the battery housing of FIG. 2A.

The first and second battery compartments 108, 112, are configured to force an exclusive accommodation of only one of the first and second batteries in the battery housing 106 at a given point in time. In the case of the lighting device 100, the first and the second battery compartments are arranged as shown in FIG. 1. A length of the first battery compartment 108, shown in an X direction is perpendicular to a length of the second battery compartment 112, shown in a Y direction. Also, both the first and the second battery compartment are in plane. In this particularly advantageous configuration, when the first battery is properly installed in the first battery compartment, the second battery cannot be installed in the second battery compartment. Conversely, when the second battery is properly installed in the second battery compartment, the first battery cannot be installed in the first battery compartment. Other lighting devices have different spatial configurations of the first and second battery compartments that also force an exclusive spatial accommodation of only one of the first and second batteries. For instance, FIGS. 2A and 2B show two different sectional views of a battery housing 206 taken in two perpendicular directions as indicated by the corresponding Cartesian axis. The first battery compartment 208 has a first electrical contact set 210 and the second battery compartment 212 has a second electrical contact set 214. In this case, the first and the second battery compartments are not in plane. The first and second battery compartments 208, 212 are configured to force an exclusive spatial accommodation of only one of the first or second battery at a given point in time. The dashed region indicates the space occupied by a second battery installed in the second battery compartment 212 and connected to the second electrical contact set 214. The presence of this battery thus hinders an installation of a first battery in the first battery compartment 208, since part of a space the battery is configured to occupy is already occupied by the second battery. Other lighting devices not shown here comprise battery housing with alternative spatial configurations that also force an exclusive accommodation of only one of the first and second batteries at a given point in time.

In the exemplary lighting device 100, the application unit requires less maximum power to operate than a maximum power required by the lighting unit, and therefore, the first battery compartment is configured to accommodate a first battery that has typically a larger size than a second battery that is designed to be installed in the second battery compartment.

Figure 3:
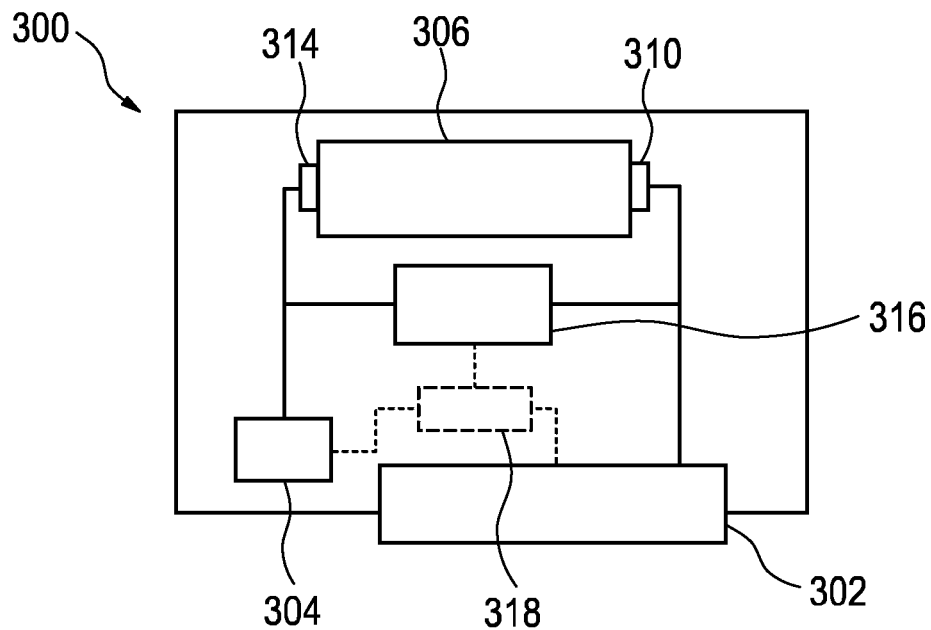
FIG. 3 shows a schematic block diagram of another exemplary embodiment of a lighting device.

FIG. 3 shows a block diagram of another embodiment 300 of a lighting device. The following description focuses on the differences between the lighting device 100 of FIG. 1 and the lighting device 300. Features shared by both lighting devices also share the same reference numbers apart from the first digit, which is "1" for the features of the lighting device 100 and "3" for the features of the lighting device 300. For the sake of clarity, the battery housing 306 is represented as a rectangular box independent of the spatial configuration of the comprised first and second battery compartments, which are not explicitly shown in FIG. 3. The lighting device 300 comprises a battery identification unit 316 that is electrically connected to the first 310 and second electrical contact set 314. The battery identification unit 316 is configured to ascertain whether or not the first or the second battery is installed in the first or the second battery compartment respectively and to provide a battery information signal indicative thereof. Some lighting devices comprise a battery identification unit that merely detect if a battery is installed in either one of the first or second battery compartment. In other lighting devices, the battery identification units are further configured to ascertain other battery parameters like a maximal capacity of the battery, a current capacity of the battery, the type of battery (e.g. if it is a rechargeable battery or a non-rechargeable battery, etc.). Some lighting devices are further compatible with smart batteries that are configured to internally measure voltage and current and ascertain a current charge level and state of health (SoH) parameters indicative of a state of the smart battery. In these lighting devices, at least one of the first and the second electrical contact sets is compatible with the smart battery, i.e. is configured to be connected to a data port of the smart battery.

The battery identification unit is configured to provide a signal indicative of whether or not the first or the second battery is installed. In some lighting devices this information is used to indicate a user or an external device if a battery is currently installed and, in case a battery is installed, in which battery compartment it is installed. Other lighting devices optionally further comprise a lighting device control unit 318 which is configured to receive the battery information signal and to control operation of the lighting unit and of the application unit in dependence on the battery information signal. As a non-limiting example, and based on a battery information signal that indicates a low charge-state of a currently installed first battery for operating the lighting unit 302, the lighting device control unit may adapt the operation of the lighting unit to reduce power consumption by the lighting function.

Figure 4:
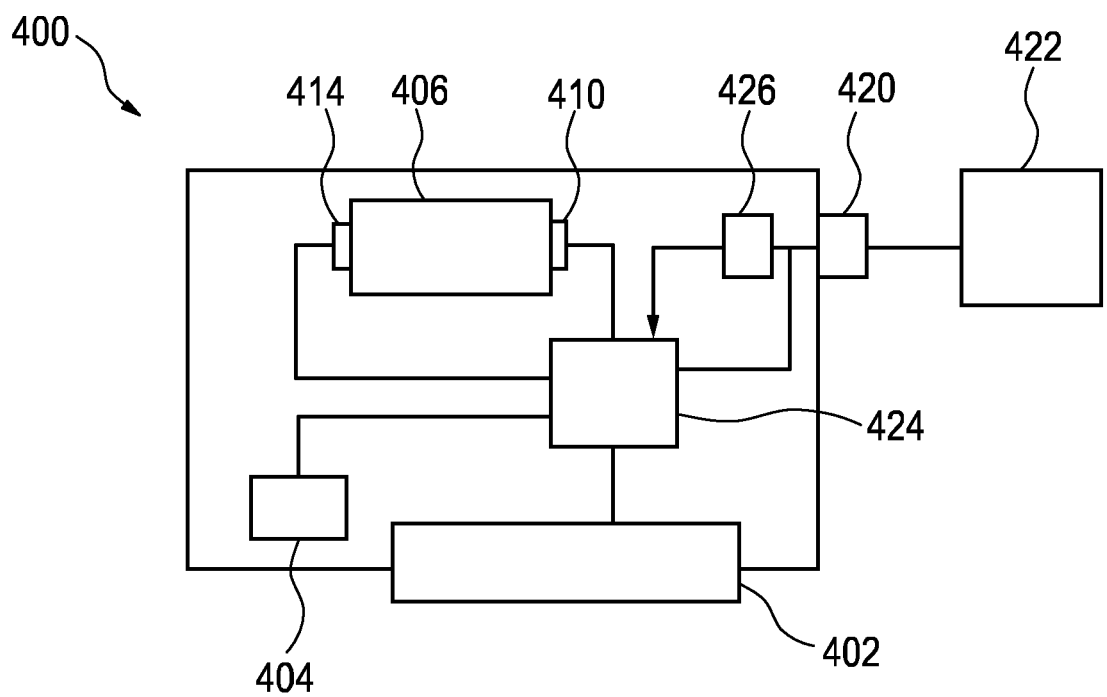
FIG. 4 shows a schematic block diagram of another exemplary embodiment of a lighting device connected to an external power supply device.

FIG. 4 shows a block diagram of another embodiment 400 of a lighting device. The following description focuses on the differences between the lighting device 100 of FIG. 1 and the lighting device 400. Features shared by both lighting devices also share the same reference numbers apart from the first digit, which is "1" for the features of the lighting device 100 and "4" for the features of the lighting device 400. For the sake of clarity, the battery housing 406 is represented as a rectangular box independent of the spatial configuration of the comprised first and second battery compartments, which are not explicitly shown in FIG. 4.

The lighting device 400 comprises a power input interface 420 that is configured to receive electrical power from an external power supply device 422 that is different from the first or the second battery. The external power supply device 422 can be, for instance, a power generator or mains electric supply. The lighting device 400 also comprises a first controllable supply switch 424 that is connected to the first electrical contact set 410, to the second electrical contact set 414, to the lighting unit 402, to the application unit 404 and to the power input interface 420. It further comprises a power control unit 426 that is configured to ascertain whether or not a sufficient amount of electrical power is being received via the power input interface 420 from the external power supply device 422 and, when a sufficient amount of electrical power is being currently delivered, to operate the first switch for allowing a transfer of power from the power-input interface to the lighting unit or to the application unit, or to both the lighting unit and the application unit. In the cases where there is no power being delivered by the external power supply device or where this power is not sufficient to operate the application unit or the lighting unit, the power control unit 426 and the controllable supply switch 424 are configured to allow a transfer of power from the first or the second electrical contact set to the lighting unit or to the application unit respectively.

Figure 5:
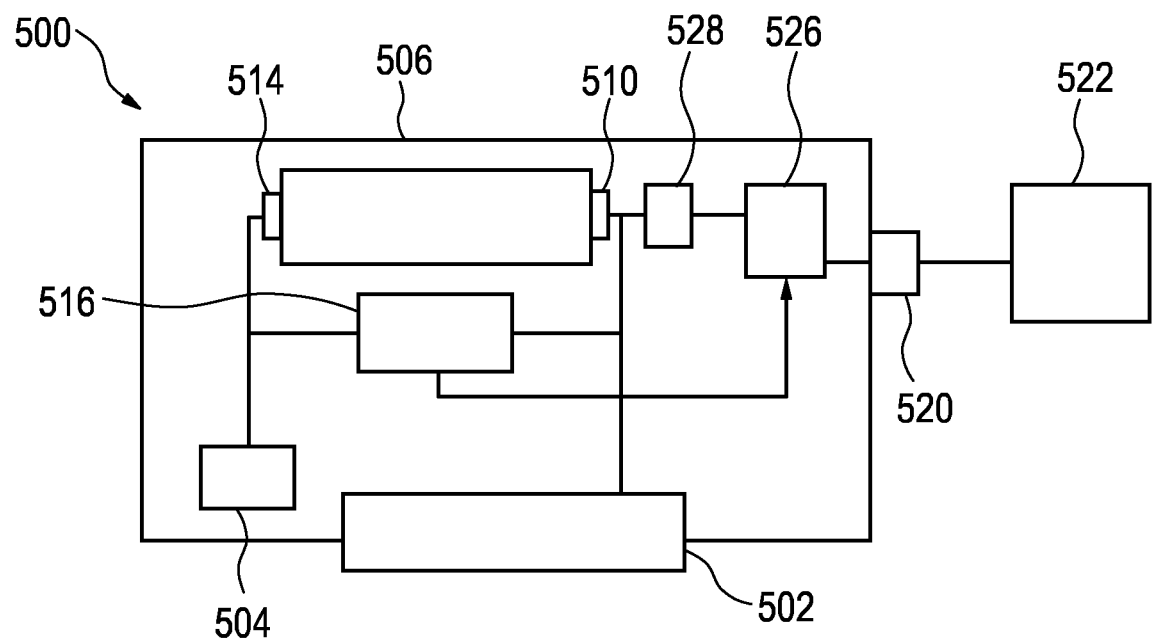
FIG. 5 shows a schematic block diagram of another exemplary embodiment of a lighting device connected to an external power supply device.

Some lighting devices that are connectable to an external power supply device via the power input interface as explained with reference to FIG. 4, and that also comprise a battery identification unit are further capable of transferring electrical power from the external power supply device to an installed battery. An example of such a lighting device 500 is explained with reference to FIG. 5. The following description focuses on the differences between the lighting devices 100 of FIG. 1 and 400 of FIG. 4 and the lighting device 500. Features shared by both lighting devices also share the same reference numbers apart from the first digit, which is "1" for the features of the lighting device 100, "4" for those of the lighting device 400 and "5" for the features of the lighting device 500. For the sake of clarity, the battery housing 506 is represented as a rectangular box independent of the spatial configuration of the comprised first and second battery compartments, which are not explicitly shown in FIG. 5. Also for the sake of clarity, the first controllable switch that is connected to the first and second electrical contact sets 510, 514, to the lighting unit 502, to the application unit 504 and to the power input interface 520 is not explicitly shown, although its functionality remains to allow a transfer of power from the power input interface to either one or both of the lighting unit, and the application unit, as explained with reference to the lighting device 400 of FIG. 4.

The lighting device 500 comprises a battery identification unit 516 that is configured to detect whether or not the installed battery is rechargeable or non-rechargeable and to include the detection result in the battery information signal. The power control unit 526 is configured to receive the battery information signal and to operate a charging circuit 528 in dependence thereof. The charging circuit 528 is connected between the power input interface and the first electrical contact set 510 and configured to transform the electrical power received and provide the transformed electrical power via the first electrical contact set 510. The lighting device 500 is therefore suitable configured to allow a charging operation of a rechargeable battery connected to the first electrical contact set when the lighting device is connected to an external power supply device. The charging operation is thus generally defined as a provision of transformed electrical power to a rechargeable battery properly installed in the first or the second battery compartment. To ensure that only rechargeable batteries are provided with transformed electrical power, an operation of the charging circuit 528 is controlled by the power control unit 526 in dependence on the battery information signal. This battery information signal is indicative of the type of battery that is currently installed and thus provides information on whether the battery is rechargeable or non-rechargeable. In other lighting devices, the charging circuit is alternatively or additionally connected to the second electrical contact set 514 (not shown).

Figure 6:
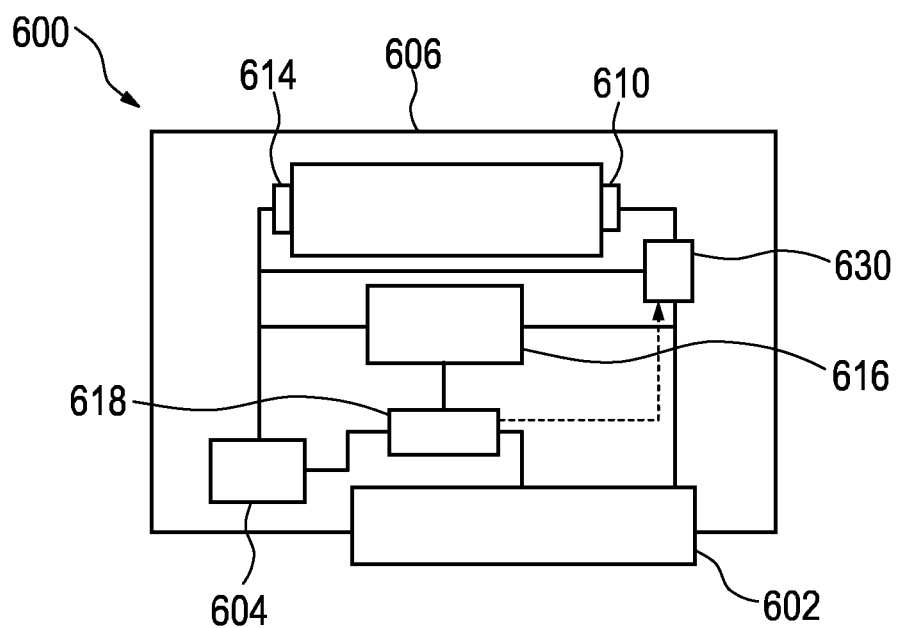
FIG. 6 shows a schematic block diagram of another exemplary embodiment of a lighting device.

FIG. 6 shows a block diagram of yet another embodiment 600 of a lighting device. In this case, the following description focuses on the differences between the lighting device 300 of FIG. 3 and the lighting device 600. Features shared by both lighting devices also share the same reference numbers apart from the first digit, which is "3" for the features of the lighting device 300 and "6" for the features of the lighting device 600. For the sake of clarity, the battery housing 606 is represented as a rectangular box independent of the spatial configuration of the comprised first and second battery compartments, which are not explicitly shown in FIG. 6.

In the lighting device 600, the application unit 604 is further electrically connectable to the first electrical contact set 610 via a second controllable supply switch 630. The lighting device is further configured to operate in a third operational mode in which the lighting device is configured to simultaneously operate the lighting unit for performing the lighting function and the application unit for performing the application function. In this lighting device 600, the lighting device control unit 618 is additionally configured to control the second supply switch for connecting or disconnecting the application unit 604 from the first electrical contact set 610.

The lighting device 600 is therefore suitably configured to operate both the application unit and the lighting unit simultaneously using power provided by the first battery via the first electrical contact set.

Some lighting devices (not shown) alternatively or additionally comprise a third controllable supply switch which enables an electrical connection between the lighting unit and the second electrical contact set. In these lighting devices, the lighting device control unit is alternatively or additionally configured to control the third supply switch for connecting or disconnecting the lighting unit from the second electrical contact set.

Figure 7:
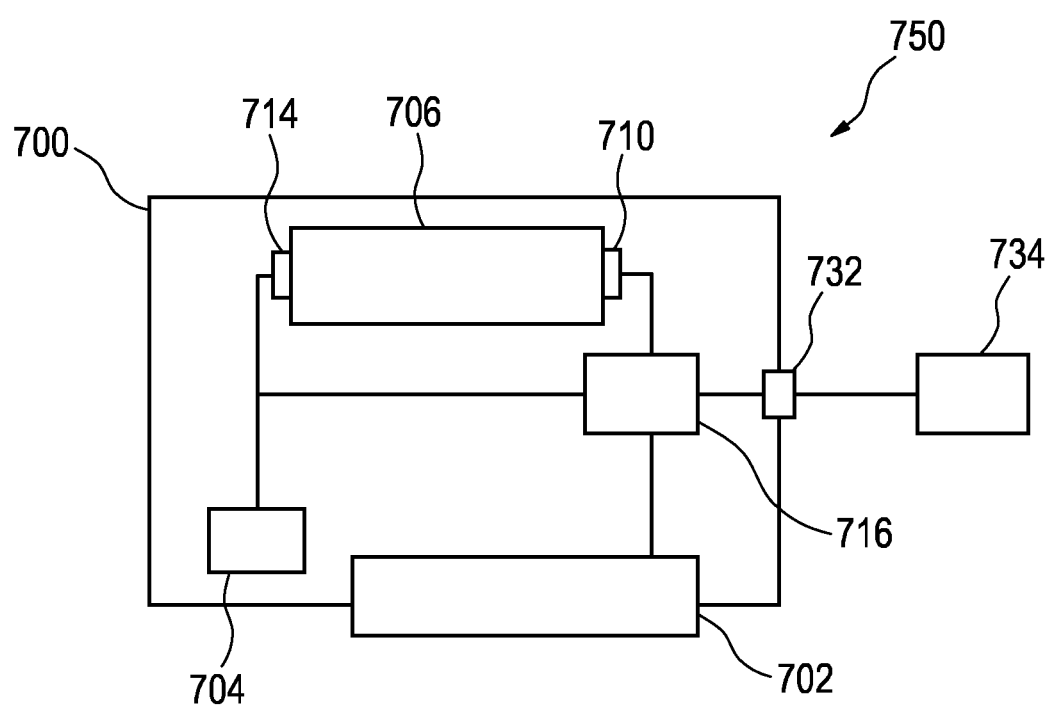
FIG. 7 shows a schematic block diagram of an embodiment of a lighting arrangement.

FIG. 7 shows a block diagram of a lighting arrangement 750 that comprises a lighting device 700 and a battery monitoring device 734. The following discussion focuses on the differences between the lighting device 300 of FIG. 3 and the lighting device 700 that forms part of the lighting arrangement 750. Features shared by both lighting devices also share the same reference numbers apart from the first digit, which is "3" for the features of the lighting device 300 and "7" for the features of the lighting device 700. For the sake of clarity, the battery housing 606 is represented as a rectangular box independent of the spatial configuration of the comprised first and second battery compartments, which are not explicitly shown in FIG. 7.

The lighting device 700 further comprises a communication unit 732 that is connected to the battery identification unit 716. The communication unit is configured to receive the battery information signal from the battery identification unit 716 and to output a battery information message in accordance with a predetermined communication protocol to the battery monitoring device 734 via a data exchange port. The battery monitoring device is configured to receive, via a data exchange port of the battery monitoring device, the battery information message in accordance with the predetermined communication protocol and to output a battery status signal indicative thereof.

Other lighting arrangement comprises a plurality of lighting device connected to one or more battery monitoring devices that are suitable configured to enable a centralized inspection of a state of the batteries installed in the respective lighting devices. The connection is in some lighting arrangements established via a wireless communication link. Other lighting arrangements comprise an optical link for transmitting the battery information message. Yet in other embodiments, the lighting device and the battery monitoring device are connected by an Ethernet cable and the battery information message is sent in accordance with an ISO communication protocol. In other lighting arrangements, the battery monitoring device is part of a sourcing equipment of a Power-over-Ethernet system. The Ethernet link is thus configured to provide both electrical power to a suitable lighting device and to convey the battery information message to the battery monitoring device, which can be implemented within the power sourcing equipment. In other lighting arrangements, the power sourcing equipment is connected to a power control unit of the lighting device. The power control unit is further configured to control operation of the lighting unit and of the application unit in dependence on instructions provided by the power sourcing equipment.

In summary, a lighting device is presented that comprises a lighting unit, at least one application unit, a battery housing comprising a first battery compartment with a first electrical contact set for accommodating and connecting a first battery, and a second battery compartment with a second electrical contact set for accommodating and connecting a second battery. The first and second battery compartments are configured to force an exclusive spatial accommodation of only one of the first and second batteries in the battery housing at a given point in time. The lighting unit is electrically connected to the first electrical contact set for being powered by the first battery in a first operational mode and the application unit is electrically connected to the second electrical contact set for being powered by the second battery in a second operational mode.

In the claims, the word "comprising" does not exclude other elements or steps, and the indefinite article "a" or "an" does not exclude a plurality.

A single step or other units may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:
1. A lighting device comprising:
 a lighting unit configured to perform a lighting function under a first operational mode of the lighting device;

at least one application unit different from the lighting unit and configured to perform an application function different from the lighting function under a second operational mode of the lighting device;

a battery housing comprising a first battery compartment with a first electrical contact set for accommodating and connecting a first battery, and a second battery compartment with a second electrical contact set for accommodating and connecting a second battery, wherein the first and second battery compartments are configured to force an exclusive spatial accommodation of only one of the first and second batteries in the battery housing at a given point in time; wherein the lighting unit is electrically connected to the first electrical contact set for being powered by the first battery in the first operational mode; and the application unit is electrically connected to the second electrical contact set for being powered by the second battery in the second operational mode; and wherein, the lighting device is configured to perform the lighting function under the first operational mode when the first battery is accommodated in the first battery compartment and perform the application function under the second operational mode when the second battery is accommodated in the second battery compartment; wherein a maximum power requirement of the lighting unit under the first operational mode is different than a maximum power requirement of the at least one application unit under the second operational mode.

2. The lighting device of claim 1, further comprising a battery identification unit electrically connected to the first and second electrical contact sets and configured to ascertain whether or not the first or second battery is installed, and to provide a battery information signal indicative thereof.

3. The lighting device of claim 2, further comprising a lighting device control unit, which receives the battery information signal and is configured to control operation of the lighting unit and of the application unit in dependence on the battery information signal.

4. The lighting device of claim 1, further comprising:
a power input interface configured to receive electrical power from an external power supply device that is different from the first or the second battery;
a first controllable supply switch; and
a power control unit configured to ascertain whether or not a sufficient amount of electrical power is being received via the power input interface, and, when a sufficient amount of electrical power is being delivered, to operate the first supply switch for allowing a transfer of power from the power input interface to the lighting unit or the application unit or to both the lighting unit and the application unit.

5. The lighting device of claim 2, further comprising:
a charging circuit connected between the power-input interface and at least one of the first and second electrical contact sets, and configured to transform the electrical power received and provide the transformed electrical power via at least one of the first and second electrical contact sets; wherein the battery identification unit is configured to detect whether or not the installed battery is rechargeable or non-rechargeable and to include the detection result in the battery information signal, and wherein the power control unit is further configured to receive the battery information signal and to operate the charging circuit in dependence on the battery information signal.

6. The lighting device of claim 3, wherein,
the application unit is further electrically connectable to the first electrical contact set via a second controllable supply switch;
under a third operational mode of the lighting device, the lighting device is configured to simultaneously operate the lighting unit for performing the lighting function and the application unit for performing the application function; and wherein
the lighting device control unit is additionally configured to control the second supply switch for connecting or disconnecting the application unit from the first electrical contact set.

7. The lighting device of claim 3, wherein:
the lighting unit is further electrically connectable to the second electrical contact set via a third controllable supply switch;
under a third operational mode of the lighting device, the lighting device is configured to simultaneously operate the lighting device for performing the lighting function and the application unit for performing the application function; and wherein
the lighting device control unit is additionally configured to control the third supply switch for connecting or disconnecting the lighting unit from the second electrical contact set.

8. The lighting device of claim 2, further comprising:
a communication unit connected to the battery identification unit and configured to receive the battery information signal and to output a battery information message, which comprises battery information, in accordance with a predetermined communication protocol to an external battery monitoring device via a data exchange port.

9. The lighting device of claim 3, further comprising:
a temperature sensing unit connected to the power-input interface and configured to monitor a temperature value of a predefined position of the lighting device and to provide a temperature signal indicative thereof; and
a thermostatic unit connected to the power input interface, the thermostatic unit configured to receive the temperature signal and to regulate the temperature value of the predefined position according to the temperature signal and to a predefined set-point temperature.

10. A lighting arrangement, comprising:
at least one lighting device according to claim 8; and
a battery monitoring device configured to receive, via a data exchange port of the battery monitoring device, the battery information message in accordance with the predetermined communication protocol, and to output a status signal indicative thereof.

* * * * *